United States Patent
Kim et al.

(10) Patent No.: US 8,203,539 B2
(45) Date of Patent: Jun. 19, 2012

(54) DISPLAY PANEL AND METHOD OF MANUFACTURING THE SAME

(75) Inventors: Sung-Man Kim, Seoul (KR); Beom-Jun Kim, Seoul (KR); Sun-Kyu Joo, Seoul (KR); Hong-Woo Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 329 days.

(21) Appl. No.: 12/616,717

(22) Filed: Nov. 11, 2009

(65) Prior Publication Data

US 2010/0188361 A1    Jul. 29, 2010

(30) Foreign Application Priority Data

Jan. 23, 2009  (KR) .................. 10-2009-0006330

(51) Int. Cl.
*G06F 3/045* (2006.01)
(52) U.S. Cl. ...................................... 345/174
(58) Field of Classification Search .................. None
See application file for complete search history.

(56) References Cited

U.S. PATENT DOCUMENTS

| | | | |
|---|---|---|---|
| 8,049,826 B2 * | 11/2011 | Kim et al. ............. | 349/12 |
| 2008/0158199 A1 | 7/2008 | Lee et al. | |
| 2008/0186288 A1 * | 8/2008 | Chang ................... | 345/174 |
| 2009/0002312 A1 | 1/2009 | Son | |

FOREIGN PATENT DOCUMENTS

| | | |
|---|---|---|
| EP | 2120136 A1 | 11/2009 |
| KR | 102008007812 A | 1/2008 |
| KR | 1020080027416 A | 3/2008 |
| KR | 1020080073866 A | 8/2008 |
| WO | 2008-108042 A1 | 9/2008 |

OTHER PUBLICATIONS

European Search Report for corresponding EP Application No. 09 01 4582 dated Apr. 15, 2010 (6 pages).

* cited by examiner

*Primary Examiner* — Wayne Young
*Assistant Examiner* — Brian Butcher
(74) *Attorney, Agent, or Firm* — Innovation Counsel LLP

(57) ABSTRACT

A display panel and a method of manufacturing the same are provided, which can prevent the deterioration of input sensitivity to the panel, and maximize the aperture ratio of the panel. The display panel includes a first substrate, a gate line and a data line crossing each other on the first substrate, in a manner that the gate line and the data line are electrically insulated from each other. The display panel further comprises a first sensor wire formed in parallel to the data line, a second sensor wire formed to overlap the data line in parallel to the data line, a second substrate arranged opposite to the first substrate, and a sensor spacer formed on the second substrate to project toward the first substrate.

16 Claims, 19 Drawing Sheets

DISPLAY PANEL AND METHOD OF MANUFACTURING THE SAME

CROSS-REFERENCE TO RELATED APPLICATION

This application claims priority from Korean Patent Application No. 10-2009-0006330 filed on Jan. 23, 2009, in the Korean Intellectual Property Office, the disclosure of which is incorporated herein in its entirety by reference.

BACKGROUND OF THE INVENTION

1. Field of the Invention

The present invention relates to a display panel and a method of manufacturing the same, and more particularly to a display panel and a method of manufacturing the same, which can prevent the deterioration of the input sensitivity of the panel, and maximize the aperture ratio of the panel.

2. Description of the Prior Art

A touch panel includes an input means which is installed on an image display surface of a liquid crystal display (LCD), a field emission display (FED), a plasma display panel (PDP), an electro luminescence display (ELD), and the like, and receives an input of information when a user presses a display screen.

A touch panel may be classified into a capacitive touch panel and a resistive touch panel. The capacitive touch panel operates in a manner that, in a state where the charge/discharge state of capacitance is repeated on a transparent conductive film or transparent conductive glass, a small amount of charge is accumulated between a stylus that is a pen type input means and the conductive film, this accumulated amount of charge is detected from an input point, and the detected amount of charge is converted into a coordinate value. Further, the resistive touch panel operates such that when a user presses a screen, two opposite conductive films come in contact with each other while a voltage is applied to the conductive films. The change in voltage or current occurring at a contact point is detected, and a coordinate value of the contact point, which corresponds to the detected change of voltage or current, is read.

Since the capacitive touch panel requires a supply of electricity to the stylus, an analog input type resistive touch panel, which is associated with a liquid crystal panel, has recently been used. In this case, in order to prevent the deterioration of luminance of the liquid crystal display panel, the resistive touch panel may be formed inside the liquid crystal display panel.

According to the liquid crystal display panel associated with a touch panel, first sensor lines and second sensor lines form a grid on a thin film transistor substrate to detect first coordinates of a horizontal position of an input point and second coordinates of a vertical position of the input point. Sensor spacers for contacting the first and second sensor lines may also be formed on a color filter substrate.

Accordingly, the aperture ratio of a display panel is reduced by the first and second sensor lines. Furthermore, the sensitivity of the second sensor lines to the input pressure deteriorates due to the presence of data lines and gate lines in the display.

SUMMARY OF THE INVENTION

Accordingly, the present invention has been made to solve the above-mentioned problems occurring in the prior art. An object of the present invention is to provide a display panel that can prevent the deterioration of the input pressure sensitivity of the panel, and maximize the aperture ratio of the panel.

Another object of the present invention is to provide a method of manufacturing a display panel that can prevent the deterioration of the input sensitivity of the panel and maximize the aperture ratio of the panel.

Additional advantages, objects, and features of the invention will be set forth in part in the description which follows and in part will become apparent to those having ordinary skill in the art upon examination of the following, or may be learned from practice of the invention.

In order to accomplish these objectives, there is provided a display panel according to an embodiment of the present invention, which includes a first substrate; a gate line and a data line crossing each other on the first substrate and electrically insulated from each other; a first sensor wire formed in parallel to the gate line; a second sensor wire formed to overlap the data line in parallel to the data line; a second substrate arranged opposite to the first substrate; and a sensor spacer formed on the second substrate to project toward the first substrate.

In another aspect of the present invention, there is provided a method of manufacturing a display panel, which includes forming a second sensor wire on a first substrate; forming a first insulating layer on the second sensor wire; forming a gate line and a first sensor wire, which cross the second sensor wire, on the first insulating layer; forming a second insulating layer on the gate line and the first sensor wire; and forming a data line to overlap the second sensor wire in parallel to the second sensor wire.

In still another aspect of the present invention, there is provided a method of manufacturing a display panel, which includes forming a gate line and a first sensor wire that is in parallel to the gate line on a first substrate; forming a first insulating layer on the gate line and the first sensor wire; forming a data line, which crosses the gate line and the first sensor wire, on the first insulating layer; forming a second insulating layer on the data line; and forming a second sensor wire formed to overlap the data line in parallel to the data line.

In still another aspect of the present invention, there is provided a method of manufacturing a display panel, which includes forming a data line on a first substrate; forming a first insulating layer on the data line; forming a gate line and a first sensor wire, which cross the data line, on the first insulating layer; forming a second insulating layer on the gate line and the first sensor wire; and forming a second sensor wire formed to overlap the data line in parallel to the data line.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
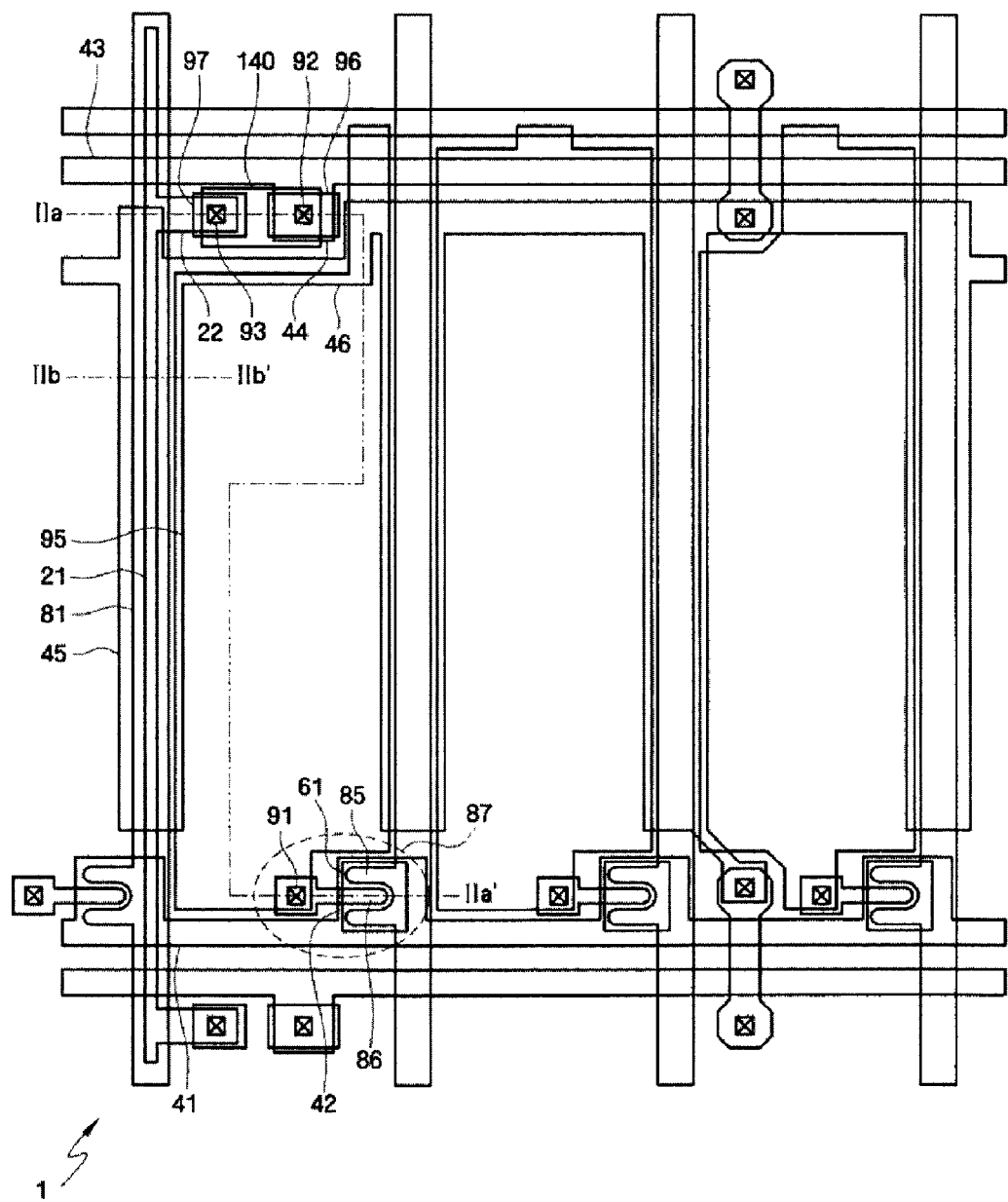
FIG. 1 is a layout diagram of a display panel according to a first embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are merely specific details provided to assist those of ordinary skill in the art in a comprehensive understanding of the invention. In the entire description of the present invention, the same drawing reference numerals are used for the same elements across various figures.

Spatially relative words such as "below", "beneath", "lower", "above", "upper", and so forth, as illustrated in the drawings, may be used to facilitate the description of relationships between an element or constituent elements, and another element or other constituent elements. The spatially relative words should be understood as words that include different directions of the element in use or operation, in addition to the direction illustrated in the drawings. For example, if an element illustrated in the drawing is turned over, the element described to be "below" or "beneath" another element may be put "above" the other element. Accordingly, the exemplary wording "below" may include both directions corresponding to "below" and "above". An element may be aligned in a different direction, and thus the spatially relative words may be interpreted according to the alignment of the element.

In the following description of the present invention, the terms used are for explaining embodiments of the present invention, but do not limit the scope of the present invention. In the description, a singular expression may include a plural expression unless specially described. The term "comprises" and/or "comprising" used in the description means that one or more other components, steps, operations and/or the existence or addition of other elements are not excluded, in addition to the described components, steps, operations and/or elements.

Figure 2A:
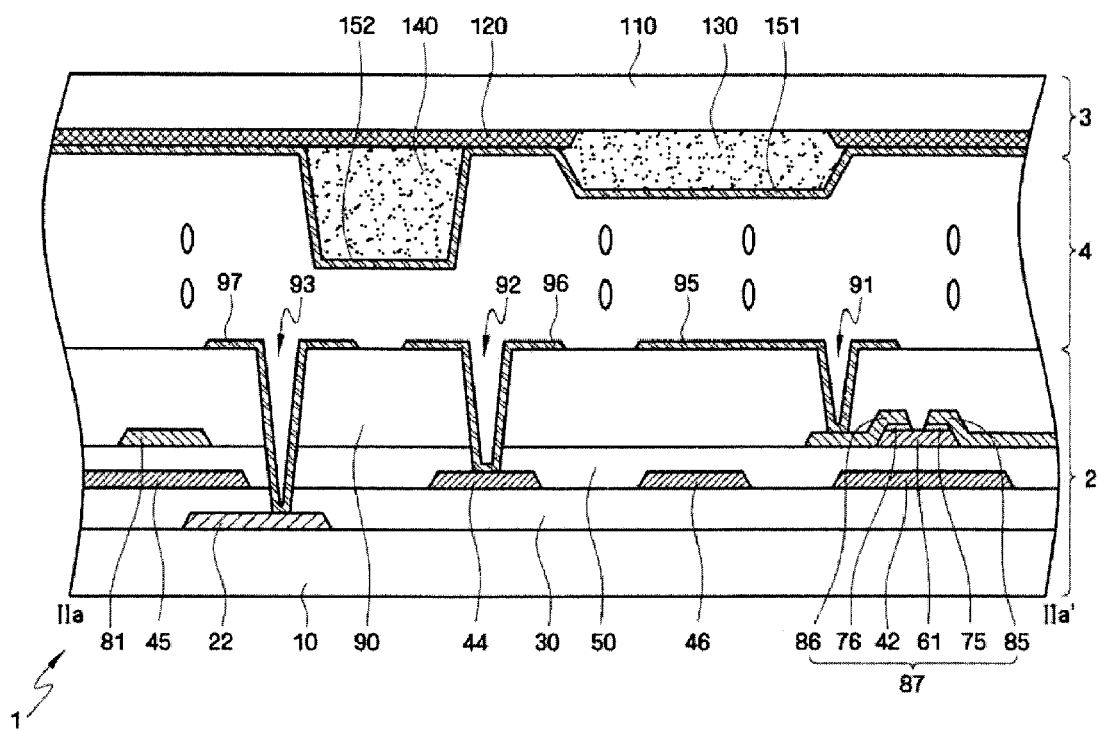
FIG. 2A is a sectional view of a display panel, taken along line IIa-IIa' in FIG. 1.
Figure 2B:
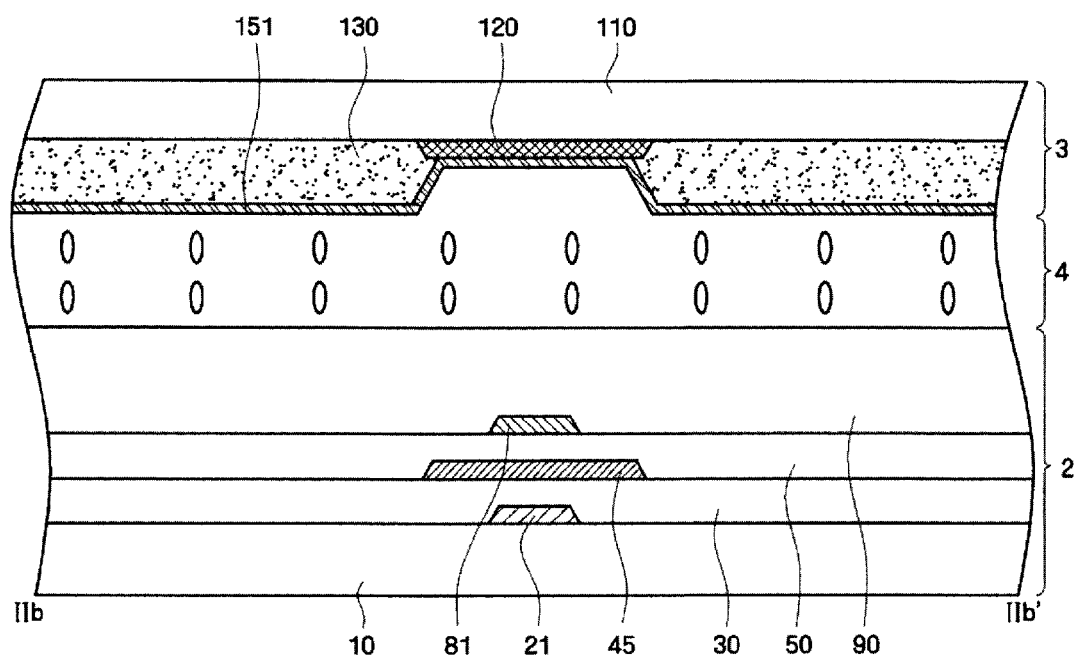
FIG. 2B is a sectional view of a display panel, taken along line IIb-IIb' in FIG. 1.

Hereinafter, with reference to FIGS. 1 to 2B, a display panel according to a first embodiment of the present invention will be described in detail. FIG. 1 is a layout diagram of a display panel according to a first embodiment of the present invention. FIG. 2A is a sectional view of a display panel, taken along line IIa-IIa' in FIG. 1, and FIG. 2B is a sectional view of a display panel, taken along line IIb-IIb' in FIG. 1.

A display panel 1 according to the first embodiment of the present invention includes a lower substrate 2 and an upper substrate 3, which are formed opposite to each other, and a liquid crystal layer 4 interposed between the two substrates 2 and 3.

The lower substrate 2 includes a gate line 41 formed on a first substrate 10, a first sensor wire 43, a data line 81, a second sensor wire 21, a blocking electrode 45, a thin film transistor (TFT), a pixel electrode 95, a first sensor pad 96, and a second sensor pad 97.

The first substrate 10 is an insulating substrate having heat resistance and transparency, such as transparent glass or plastic. On the first substrate 10, the second sensor wire 21 is formed, extended in a direction parallel to a data line 81, to be described later. The second sensor wire 21, for example, transfers a Y-coordinate signal. Similarly, for example, the first sensor wire 43 transfers an X-coordinate signal. On one side of the second sensor wire 21, a second sensor wire extension part 22, connected to the second sensor pad 97, is branched. On the second sensor wire 21 and the second sensor wire extension part 22, a first insulating film 30 made of silicon nitride (SiNx) is formed.

On the first insulating film 30, the first sensor wire 43 and the gate line 41, which cross the second sensor wire 21, are formed. The first sensor wire 43 and the gate line 41 are insulated from the second sensor wire 21 by the first insulating film 30. The gate line 41 is formed on the first substrate 10 in a first direction, and transfers a gate signal to the thin film transistor (TFT). The first direction, for example, may be a horizontal direction of the first substrate 10. In this case, the gate line 41 may be formed as a single layer or a multi-layer made of any one of molybdenum (Mo), niobium (Nb), copper (Cu), aluminum (Al), chrome (Cr), silver (Ag), tungsten (W), titanium (Ti), and their alloys. One end part of the gate line 41 is branched to form an extended gate electrode 42.

The first sensor wire 43 is formed in the first direction in parallel to the gate line 41. The first sensor wire 43 may be formed of the same material as the gate line 41 on the same layer as the gate line 41.

On the second sensor wire 21, the blocking electrode 45 is formed. The blocking electrode 45 overlaps the second sensor wire 21, and prevents the occurrence of interference between the second sensor wire 21 and the data line 81. For example, the data signal being applied to the data line has a continuously changing waveform with a non-uniform voltage level. The data signal affects the second sensor wire 21, and thus it is required to form the blocking electrode 45 between the second sensor wire 21 and the data line 81. A DC voltage having the same voltage level as the common voltage may be applied to the blocking electrode 45.

On the other hand, at least a part of the blocking electrode 45 overlaps the pixel electrode 95 to be described later to form a storage capacitor. The blocking electrode 45 is connected to a storage electrode 46, which partially overlaps the pixel electrode 95.

On the gate line 41, the first sensor wire 43, and the blocking electrode 45, a second insulating film 50 is spread. In one embodiment of the invention, the second insulating film can be made of silicon nitride (SiNx).

On the second insulating film 50, a semiconductor layer 61 made of hydrogenated amorphous silicon or polycrystalline silicon is formed. On an upper part of the semiconductor layer 61, ohmic contact layers 75 and 76 made of silicide or n+ hydrogenated amorphous silicon, doped with high-density n-type impurities, are formed. The ohmic contact layers 75 and 76 constitute a pair, and are positioned on the semiconductor layer 61.

On the ohmic contact layers 75 and 76 and the second insulating film 50, the data line 81, and a drain electrode 86 that corresponds to the data line 81, are formed.

The data line 81 is formed on the first substrate 10 in a second direction, and transfers a data signal to each pixel. The second direction, for example, may be a vertical direction of the first substrate 10. In this case, the data line 41 may be formed as a single layer or a multi-layer made of a material selected from the group comprising at least one of the following: molybdenum (Mo), niobium (Nb), copper (Cu), aluminum (Al), chrome (Cr), silver (Ag), tungsten (W), titanium (Ti), and their alloys.

The data line 81 is formed to overlap the second sensor wire 21. Both the data line 81 and the second sensor wire 21 are formed of an opaque metallic material. The data line 81 and the second sensor wire 21 reduce the aperture ratio of the display panel 1, by reducing the transparency of light. As used herein, the aperture ratio of the display panel is defined as . . . . The data line and the second sensor wire are formed of materials that have a reduced light transparency. Therefore, a person of ordinary skill in the art of designing and making display panels would recognize that, in general, the data line and the second sensor wire tend to reduce the aperture ratio of the display panel. Accordingly, by overlapping the data line 81 and the second sensor wire 21, a light blocking area is reduced, and thus the aperture ratio can be increased.

On the data line 81, a source electrode 85 extending toward the drain electrode 86 is formed. The drain electrode 86 transfers the data signal to the pixel electrode 95.

The gate electrode 42, the source electrode 85, and the drain electrode 86 form three terminals of the thin film transistor (TFT). The thin film transistor (TFT) transfers the source electrode's input data signal to the pixel electrode 95 through the drain electrode 86, in response to the gate signal.

The thin film transistor (TFT) includes the semiconductor layer 61 that forms a channel between the source electrode 85 and the drain electrode 86 as it is interposed between and partially overlaps the gate electrode 42 and the second insulating film 50.

A passivation film 90 is formed of an inorganic material such as silicon nitride (SiNx) or silicon oxide (SiOx), or an organic material such as acrylic, polyimide, or benzocyclobutene (BCB). Here, the passivation film 90 may be a single layer or a multi-layer formed of an inorganic material and an organic material. The passivation film 90 is formed to cover the thin film transistor (TFT) and the second insulating film 50, and insulates the thin film transistor (TFT) and the pixel electrode 95.

The passivation film 90 includes first to third contact holes 91, 92, and 93 for exposing the drain electrode 86, the first sensor wire 43 and the second sensor wire 21. Here, the first to third contact holes 91, 92, and 93 are formed by etching a part of the passivation film 90 through a mask.

The pixel electrode 95 is formed on the upper part of the passivation film 90. The pixel electrode 95 is connected to the drain electrode 86 of the thin film transistor (TFT) through the first contact hole 91. The pixel electrode 95 is made of a transparent conductive material, such as ITO (Indium Tin Oxide) or IZO (Indium Zinc Oxide), or a reflective conductive material such as aluminum.

The first sensor pad 96 contacts a sensor electrode 152 to be described later, and provides a signal for recognizing an X-axis coordinate value to the first sensor wire 43. The first sensor pad 96 is connected to a first sensor wire extension part 44 branched from the first sensor wire 43 through the second contact hole 92.

The second sensor pad 97 contacts the sensor electrode 152 to be described later, and provides a signal for recognizing a Y-axis coordinate value to the second sensor wire 21. The second sensor pad 97 is connected to the second sensor wire extension part 22 branched from the second sensor wire 21 through the third contact hole 93.

The first sensor pad 96 and the second sensor pad 97 are formed to overlap a sensor spacer 140 to be described later and the sensor electrode 152. The first sensor pad 96 and the second sensor pad 97 may be formed of the same material as the pixel electrode 95 through the same process.

Next, the upper substrate 3 includes a black matrix 120 formed on the second substrate 110 to prevent light leakage, a color filter 130 for color representation, and a common electrode 151 applying a common voltage to the liquid crystal layer 4.

The second substrate 110 may be formed of a transparent insulating material that transmits the light, and may be formed of a material, such as glass or plastic that is flexible in accordance with pressure being applied to the upper part thereof.

In order to prevent light from leaking out of the display through an area where the liquid crystals cannot be controlled, the black matrix 120 may be formed to overlap the thin film transistor (TFT) of the lower substrate 2, the gate line 41, the data line 81, the first sensor wire 43, and the second sensor wire 21. The black matrix 120 may be formed of an opaque organic material, or opaque metal.

The color filter 130 is composed of red, green, and blue color filters to represent colors. The color filter 130 represents red, green, and blue colors by absorbing or transmitting light of specified wavelengths through the red, green, and blue pigments included therein. In this case, the color filter represents diverse colors through the additive mixture of transmitted red, green, and blue colors.

The common electrode 151 is formed on the upper parts of the color filter 130 and the black matrix 120. On the color filter 130 and the black matrix 120, an overcoat layer (not illustrated) for reducing the unevenness of the color filters may be formed, and the common electrode 151 may be formed on the upper part of the overcoat layer. Here, the common electrode 151 may be formed of a transparent conductive material such as ITO (Indium Tin Oxide) or IZO (Indium Zinc Oxide). The common electrode 151 applies an electric field for driving liquid crystals, which is formed by a difference between the common voltage being supplied from the common voltage generator and the voltage of the data signal of the pixel electrode 95, to the liquid crystal layer 4.

The sensor spacer 140 may be formed on the black matrix 120. That is, the sensor spacer 140 is formed to overlap the black matrix 120 that does not transmit the light, and the sensor electrode 152 is formed on the sensor spacer 140. The sensor spacer 140 may be formed of an organic material in the same process as the organic material of the color filter 130. However, the forming of the sensor spacer 140 in the same process as the color filter 130 is merely exemplary, and the sensor spacer may be formed together with the overcoat layer (not illustrated) on the black matrix 120, or may be separately formed in an independent process.

The sensor spacer 140 projects toward the first substrate 10. The sensor electrode 152 is formed on the sensor spacer 140. If a user applies pressure to a certain point of the upper substrate 3, the second substrate 110 is curved downward, and the sensor spacer 140 makes contact with the first sensor pad 96 and the second sensor pad 97, so that the pressed position can be recognized.

Before the pressure is applied to the upper substrate 3, the sensor spacer 140 and the first/second sensor pads 96 and 97 are spaced apart from each other for a specified distance.

In the display panel according to an embodiment of the present invention, if a user applies pressure to the upper substrate 1, the sensor spacer 140 makes contact with the first sensor pad 96 and the second sensor pad 97. In this case, the resistance value of the segment of the first sensor wire and the segment of the second sensor wire in contact with the sensor electrode 152 is varied in accordance with the contact point. This variable resistance value causes a current or voltage difference, so that the X-coordinate signal is transmitted through the first sensor wire 43, and the Y-coordinate signal is transmitted through the second sensor wire 21.

Hereinafter, with reference to FIGS. 3A to 7C, a method of manufacturing a lower substrate included in the display panel according to an embodiment of the present invention will be described in detail. FIGS. 3A to 7C are process views explaining a process of manufacturing a lower substrate included in the display panel of FIG. 1.

Figure 3A:
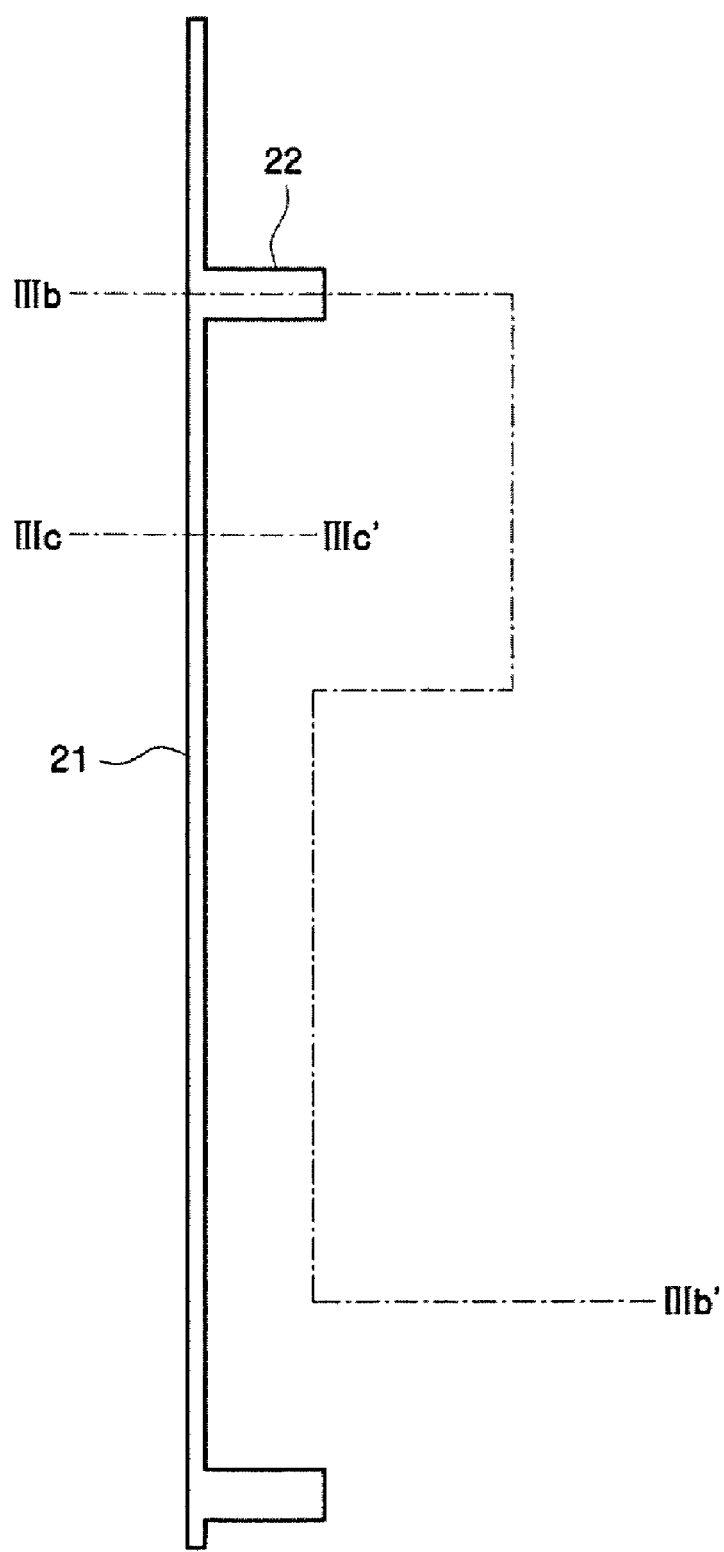
FIGS. 3A to 7C are process views explaining a process of manufacturing a lower substrate included in the display panel of FIG. 1.
Figure 3B:
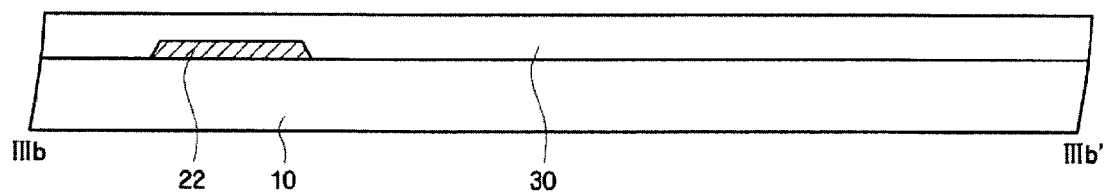
Figure 3C:
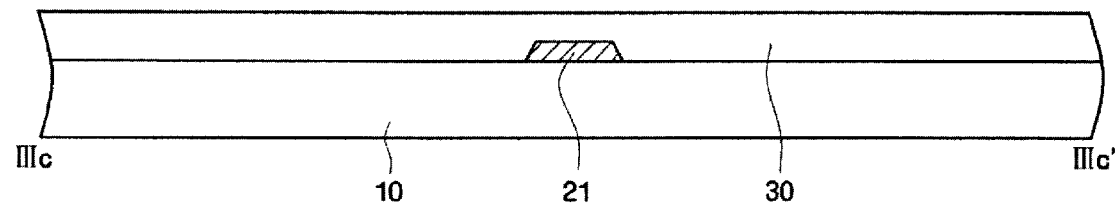

First, referring to FIGS. 3A to 3C, the second sensor wire 21 is formed on the first substrate 10. Specifically, a sensor wire conduction layer is laminated on the first substrate 10 by sputtering. The sensor wire conduction layer is deposited on the front surface of the first substrate 10. Then, by photo-etching the sensor wire conduction layer, the second sensor wire 21 is formed. The second sensor wire 21 may be extended in a vertical direction of the first substrate 10.

On the second sensor wire 21, the first insulating layer 30 made of silicon nitride (SiNx) is formed.

Figure 4A:
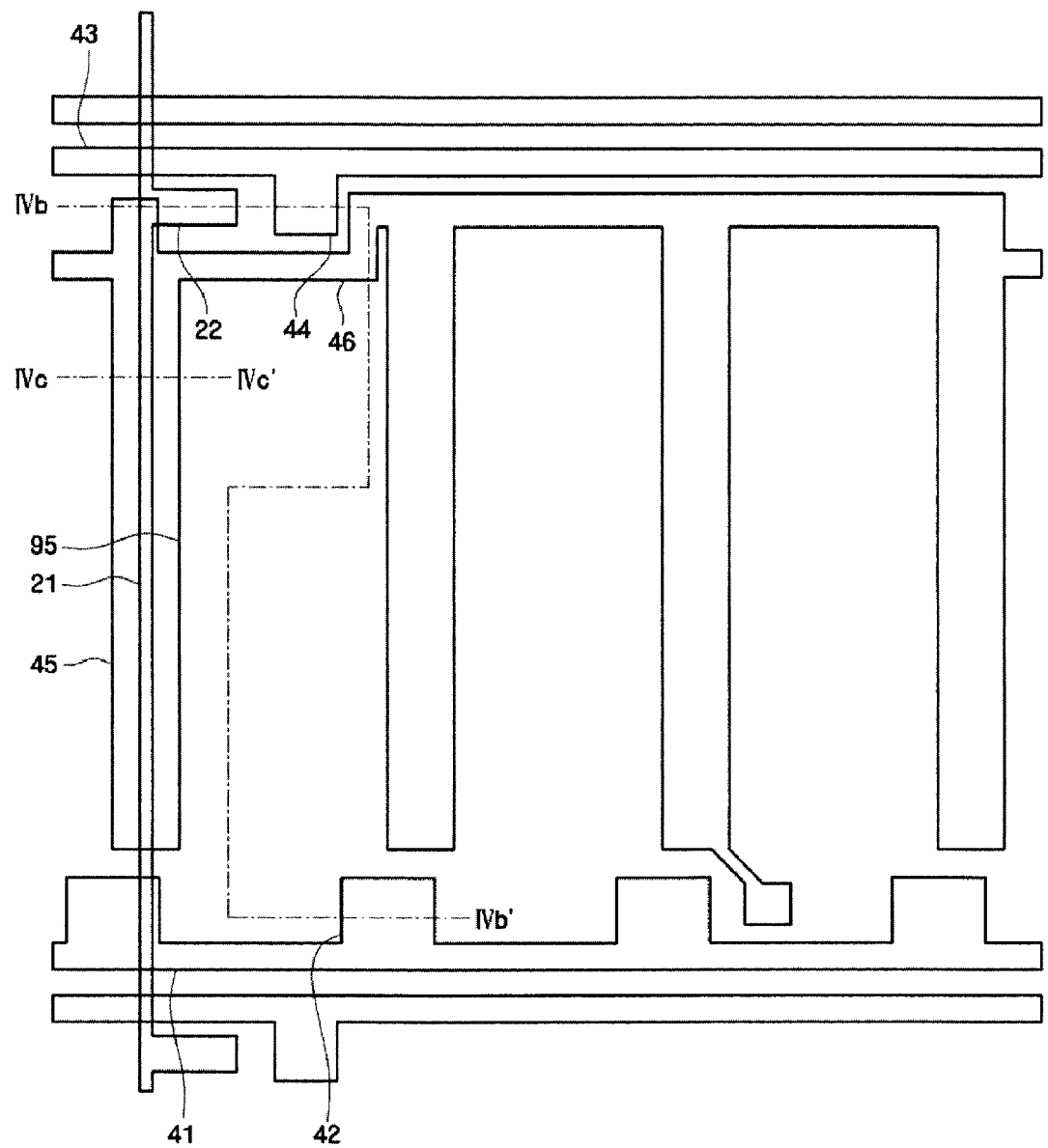
Figure 4B:
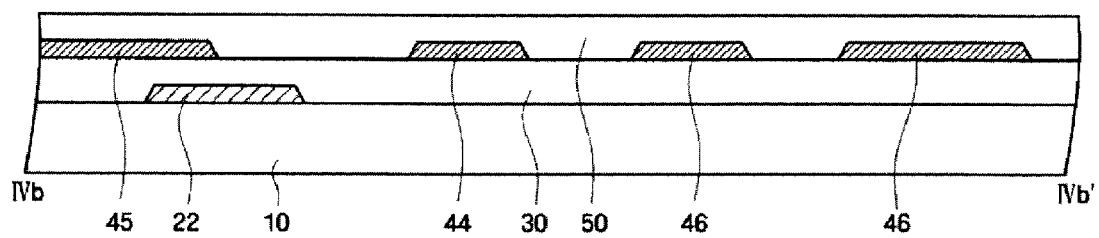
Figure 4C:
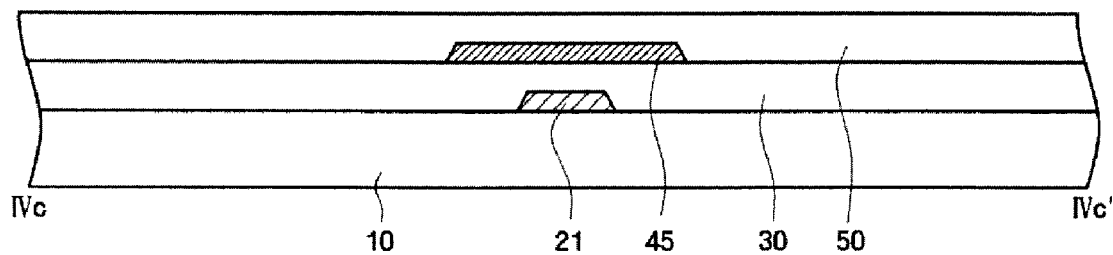

Then, referring to FIGS. 4A to 4C, the gate line 41, the first sensor wire 43, and the blocking electrode 45, are formed on the first insulating film 30. Specifically, a gate conduction layer is laminated on the front surface of the first insulating film 30, using a sputtering method. Then, the gate line 41, the first sensor wire 43 and the blocking electrode 45 are formed by photo-etching the gate conduction layer.

The gate line 41 and the first sensor wire 43 cross the second sensor wire 21, and are extended in the horizontal direction of the first substrate 10. The gate line 41 and the first sensor wire 43 are formed in parallel to each other.

The blocking electrode 45 is formed between the gate wire 41 and the first sensor wire 43, and overlaps the second sensor wire 21. The blocking electrode 45 is connected to the storage electrode 46.

On the first insulating film 30, the gate line 41, the first sensor wire 43, and the blocking electrode 45, the second insulating film 50 is formed by chemical vapor deposition (CVD).

Figure 5A:
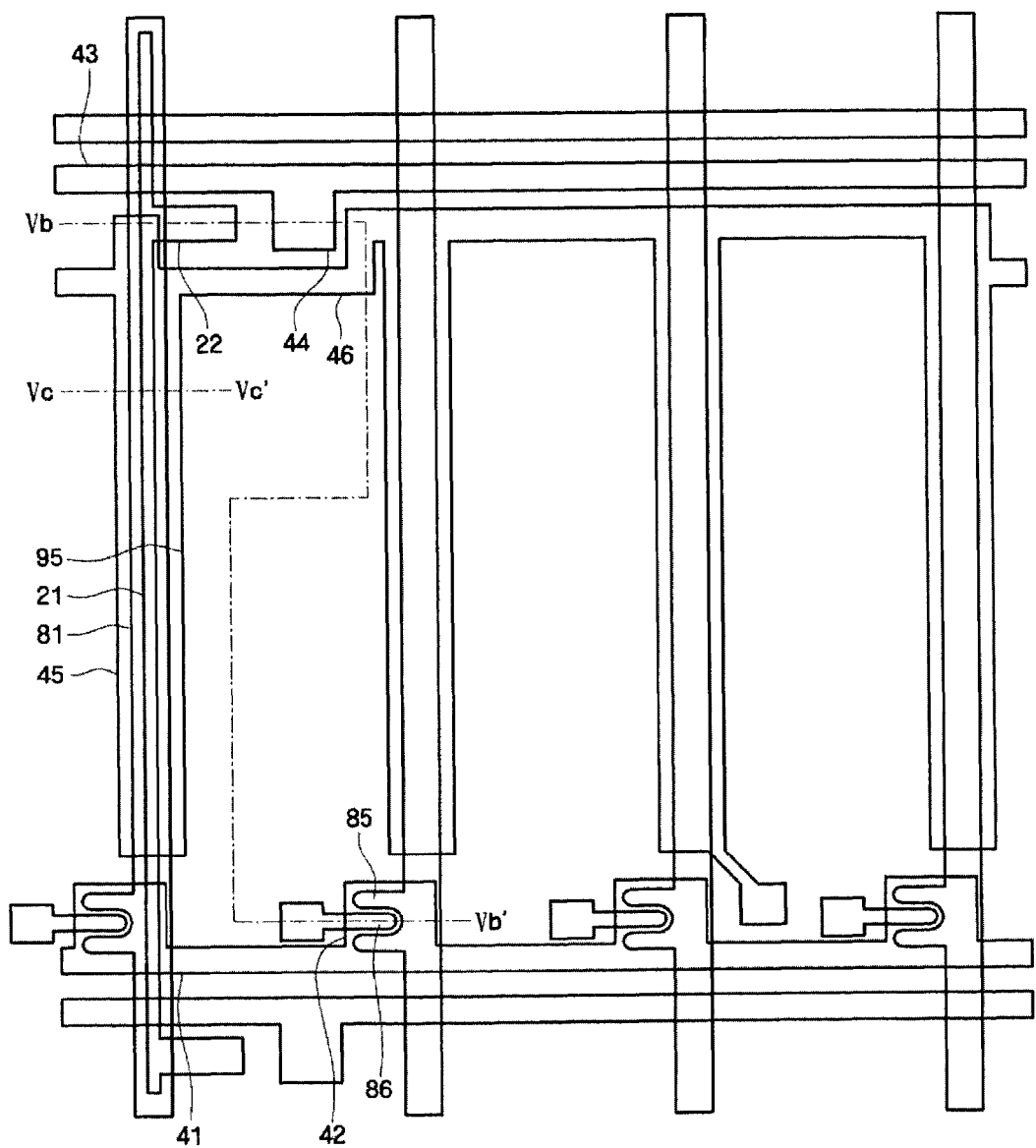
Figure 5B:
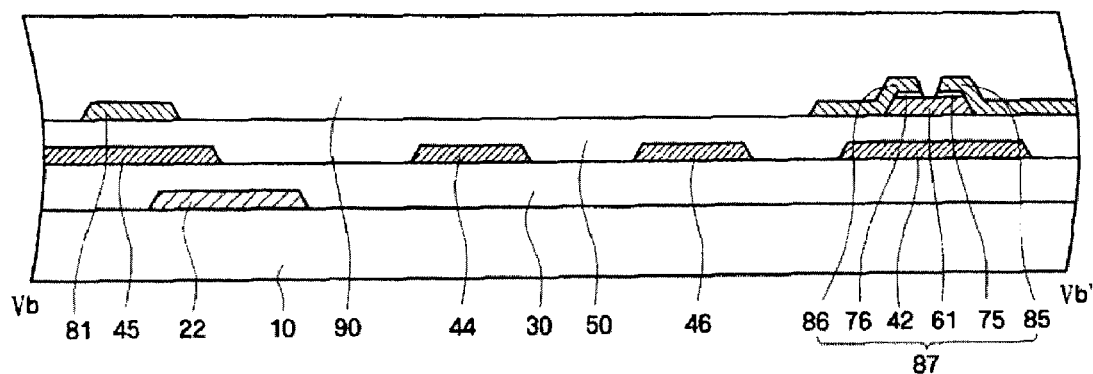
Figure 5C:
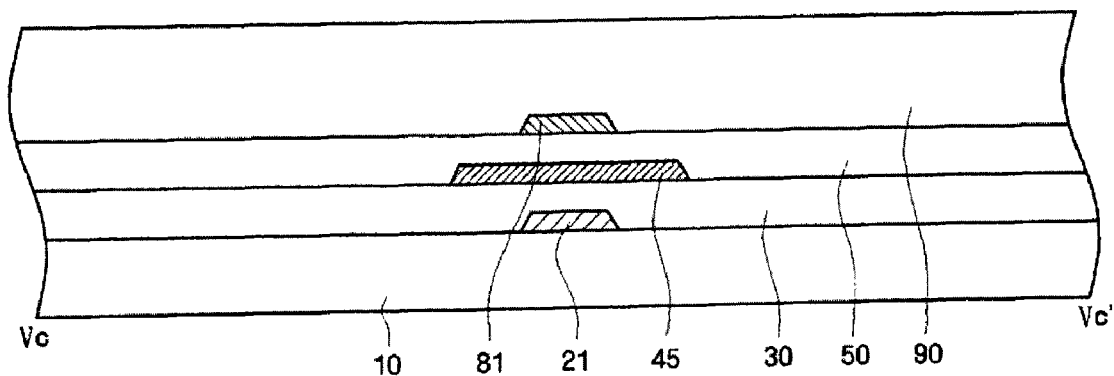

Then, referring to FIGS. 5A to 5C, on the second insulating film 50, the semiconductor layer 61, the data line 81, the source electrode 85, and the drain electrode 86 are formed. Specifically, on the second insulating film 50, a first amorphous silicon layer made of hydrogenated amorphous silicon and a second amorphous silicon layer made of silicide or n+ hydrogenated amorphous silicon, doped with high-density n-type impurities, are laminated in sequence. The lamination of the first amorphous silicon layer and the second amorphous silicon layer may be performed by chemical vapor deposition (CVD).

The first amorphous silicon layer and the second amorphous silicon layer, except for an area where an active layer is formed on the gate electrode 42 of each pixel, are removed by photo-etching. The first amorphous silicon layer is etched to form the semiconductor layer 61, and the second amorphous silicon layer is etched to form the ohmic contact layers 75 and 76.

The semiconductor layer 61 and the ohmic contact layers 75 and 76 may be formed, for example, by dry etching, and the semiconductor layer 61 and the ohmic contact layers 75 and 76 may be etched simultaneously or separately in some cases.

Then, on the second insulating film 50, the semiconductor layer 61, and the ohmic contact layers 75 and 76, a data conduction layer is laminated. The data conduction layer is generally laminated on the first substrate 10 to cover the second insulating film 50, the semiconductor layer 61, and the ohmic contact layers 75 and 76. By patterning the data conduction layer by wet etching and so on, the data line 81, the source electrode 85, and the drain electrode 86 are formed.

Then, on the second insulating film 50, the data line 81, the source electrode 85, the drain electrode 86, and the passivation film 90 are formed. The passivation film 90 may be made of silicon oxide (SiOx), silicon oxynitride (SiOxNy), and silicon nitride (SiNx), and may be laminated by CVD or sputtering method.

Figure 6A:
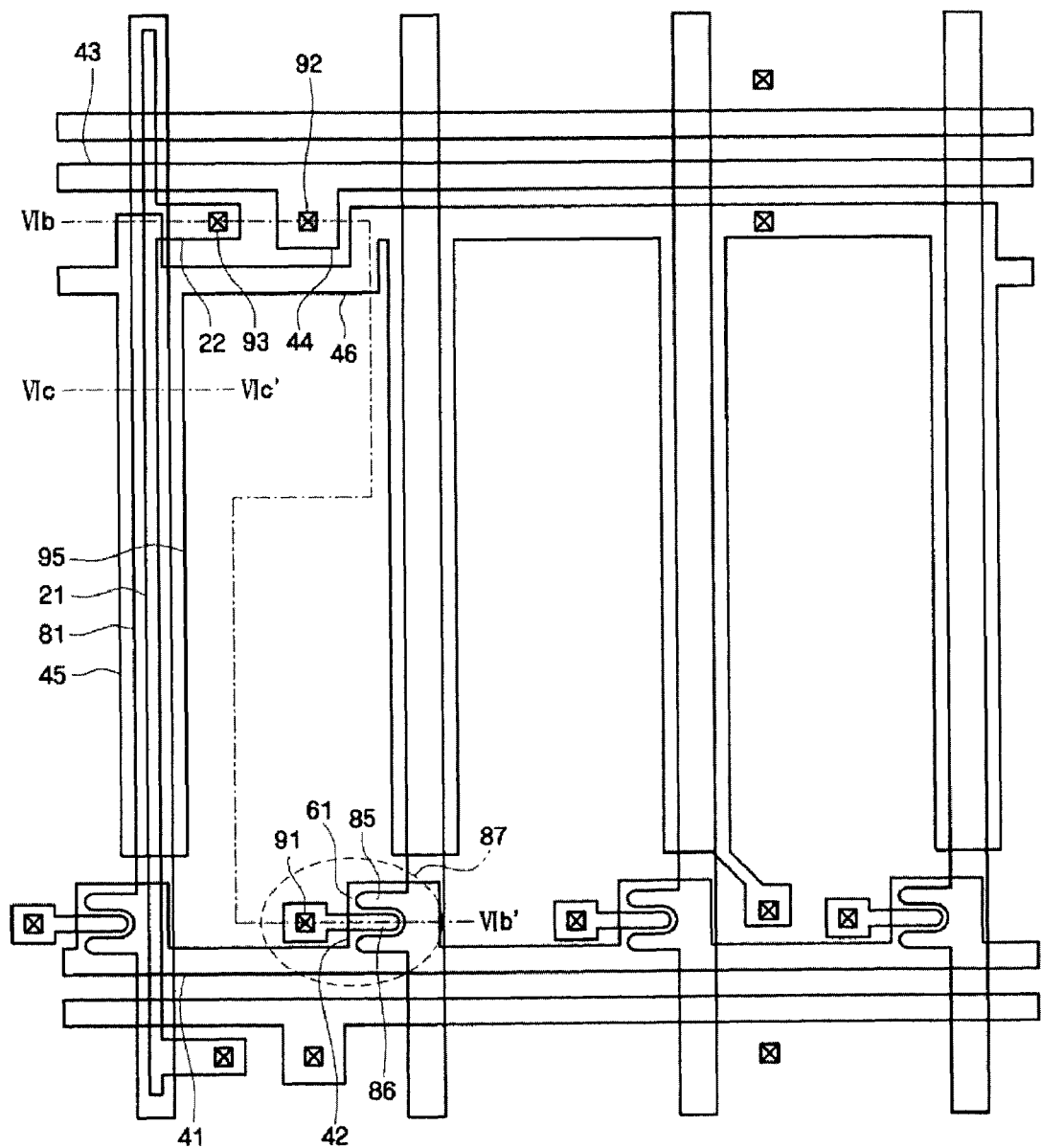
Figure 6B:
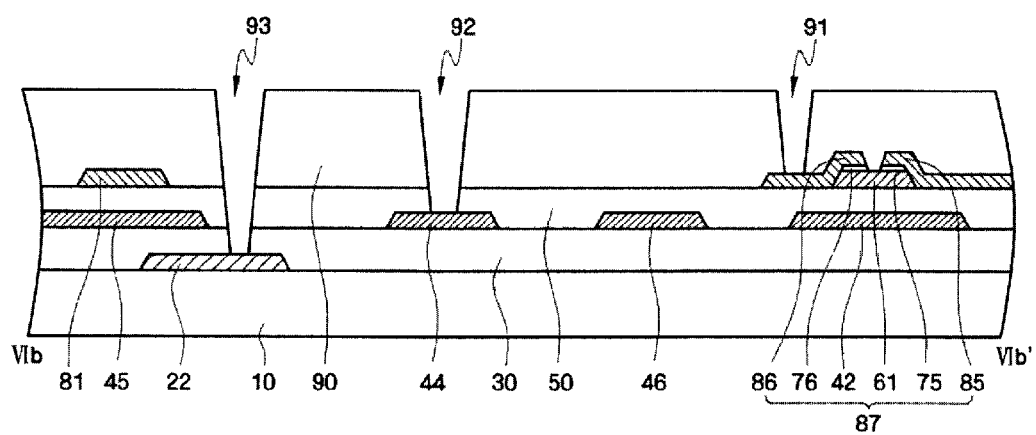
Figure 6C:
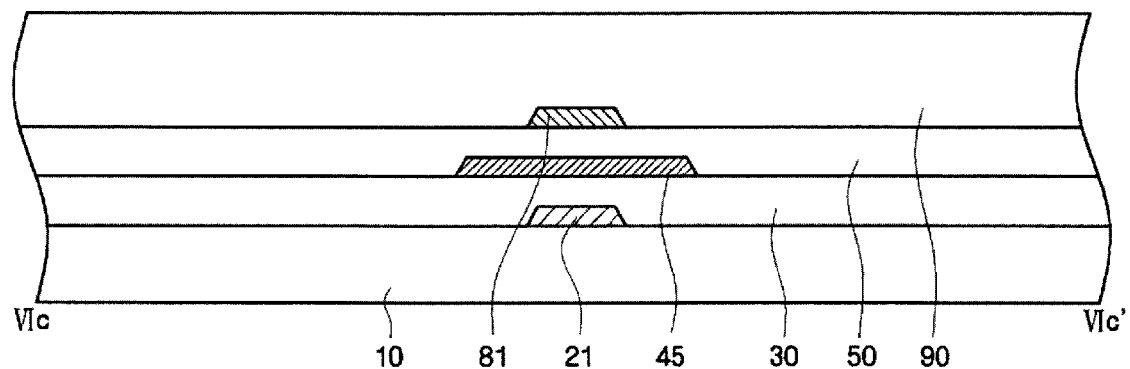

Then, referring to FIGS. 6A to 6C, first to third contact holes 91, 92, and 93 are formed by etching the passivation film 90.

The first contact hole 91 is formed by etching the passivation film 90 on the drain electrode 86. By etching the passivation film 90 on the drain electrode 86, a part of the drain electrode 86 is exposed.

The second contact hole 92 is formed by etching the second insulating film 50 and the passivation film 90 on the first sensor wire extension part 44. By etching the second insulating film 50 and the passivation film 90 on the first sensor wire extension part 44, a part of the first sensor wire extension part 44 is exposed.

The third contact hole 93 is formed by etching the first insulating film 30, the second insulating film 50, and the passivation film on the second sensor wire extension part 22. By etching the first insulating film 30, the second insulating film 50, and the passivation film 90, a part of the second sensor wire extension part 22 is exposed.

Figure 7A:
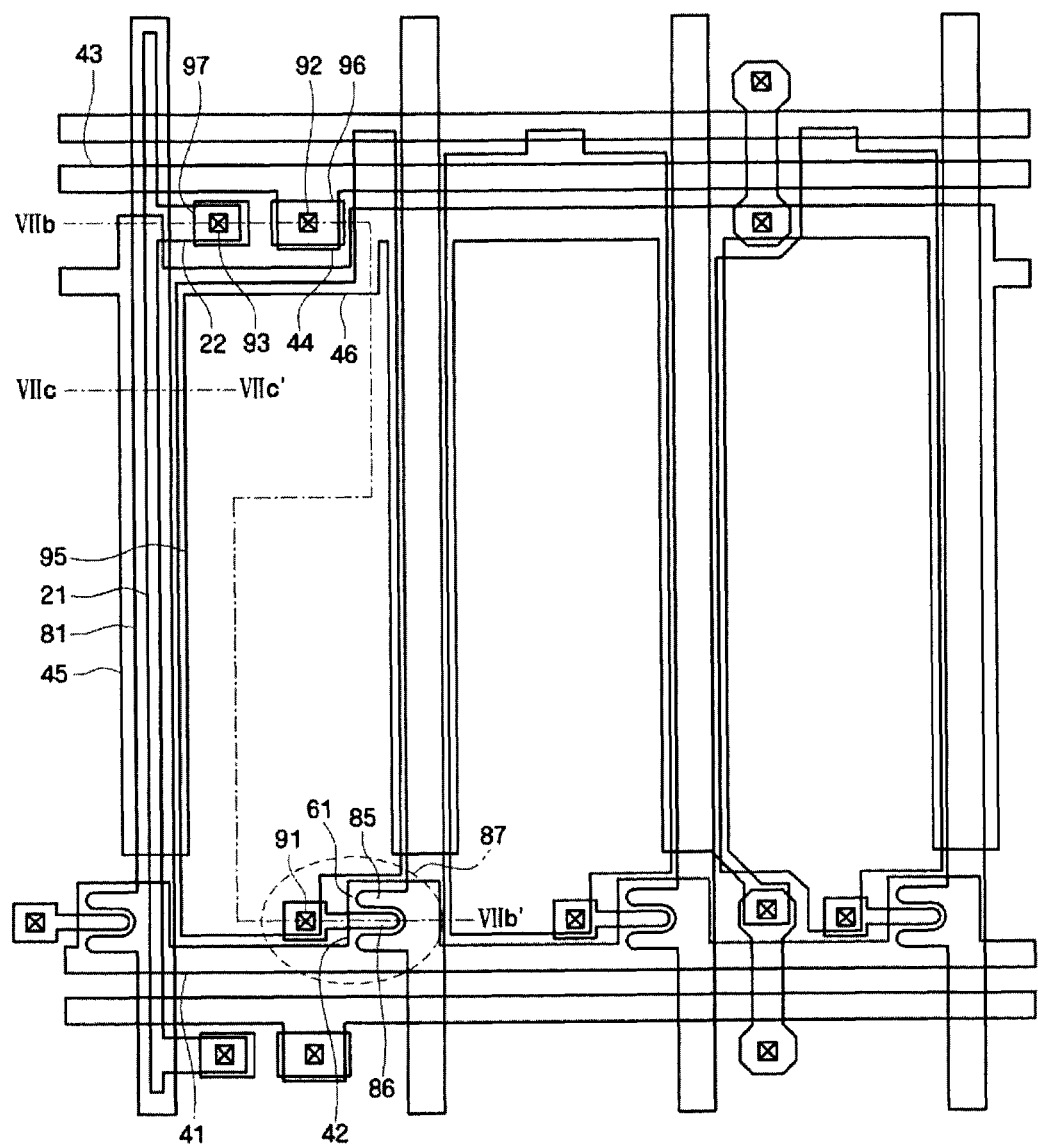
Figure 7B:
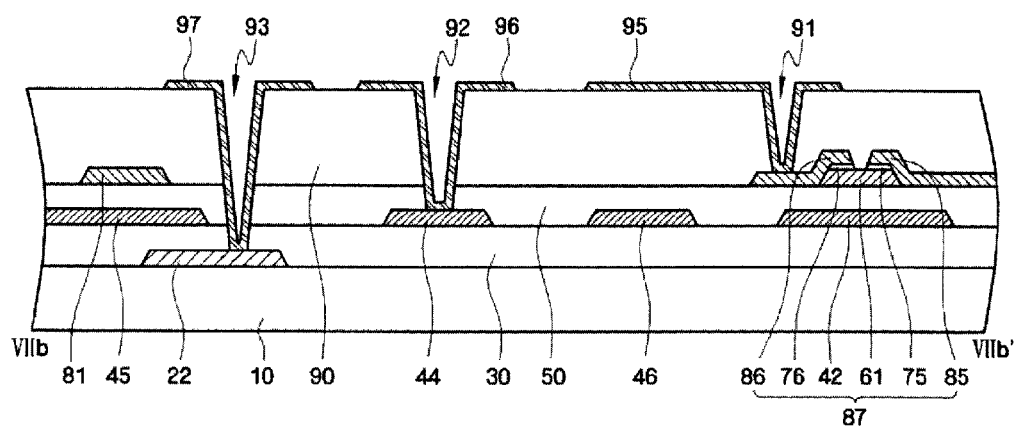
Figure 7C:
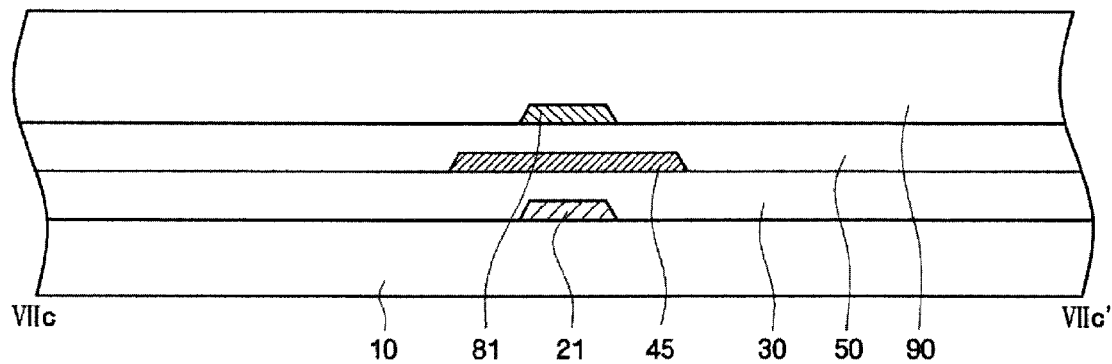

Then, referring to FIGS. 7A to 7C, the pixel electrode 95, the first sensor pad 96, and the second sensor pad 97 are formed on the passivation film 90. Specifically, a transparent conduction layer is formed by laminating a transparent conductive material such as ITO or IZO on the passivation film 90. The transparent conduction layer is formed on the passivation film 90, and is in contact with the drain electrode 86, the first sensor wire extension line 44 and the second sensor wire extension part 22, through the first to third contact holes 91 to 93.

The transparent conduction layer is patterned to form the pixel electrode 95, the first sensor pad 96, and the second sensor pad 97. The pixel electrode 95 is in contact with the drain electrode 86 through the first contact hole 91, the first sensor pad 96 is in contact with the first sensor wire extension line 44 through the second contact hole 92. The second sensor pad 97 is in contact with the second sensor wire extension part 22 through the third contact hole 93.

Figure 8:
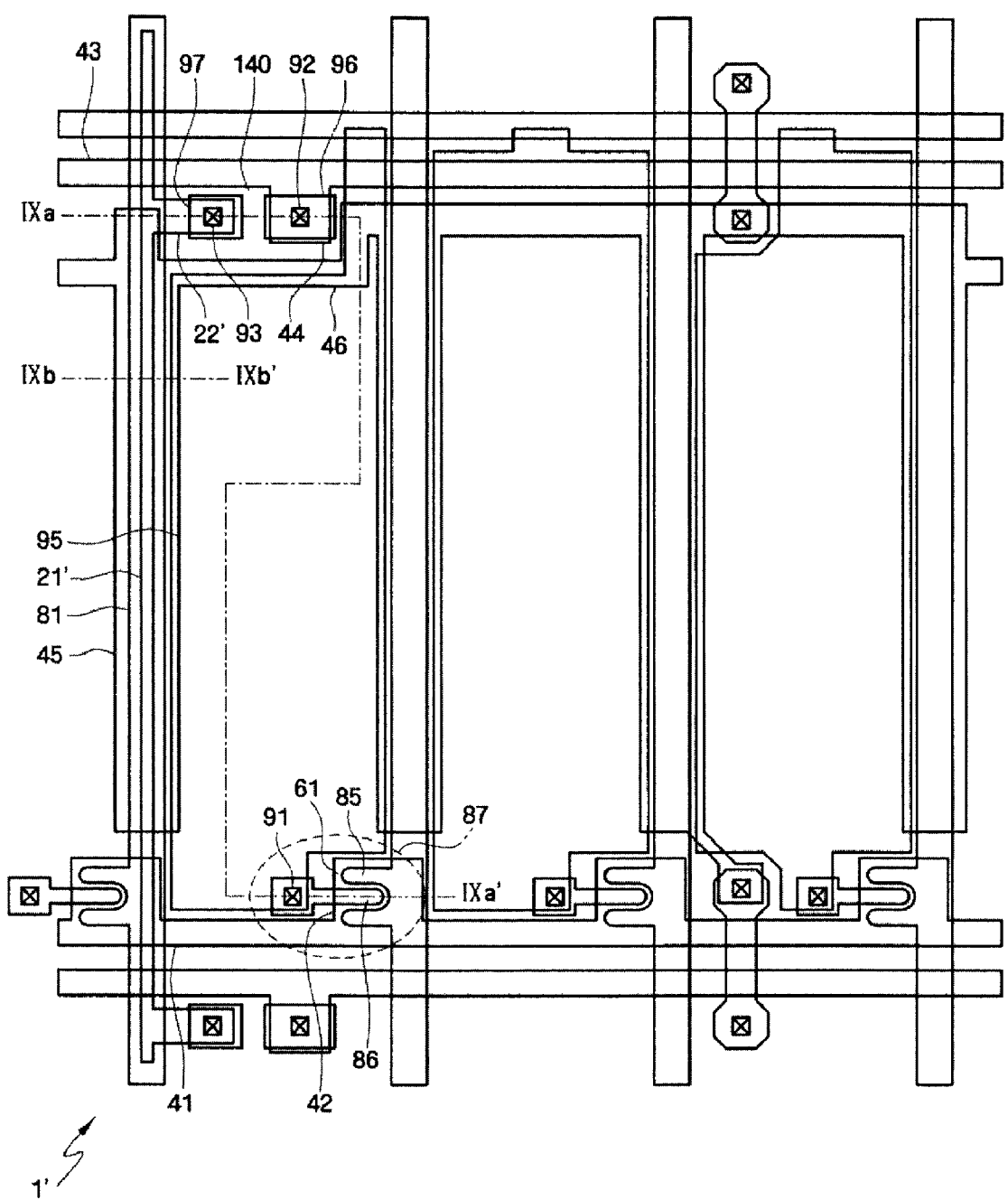
FIG. 8 is a layout diagram of a display panel according to a second embodiment of the present invention.
Figure 9A:
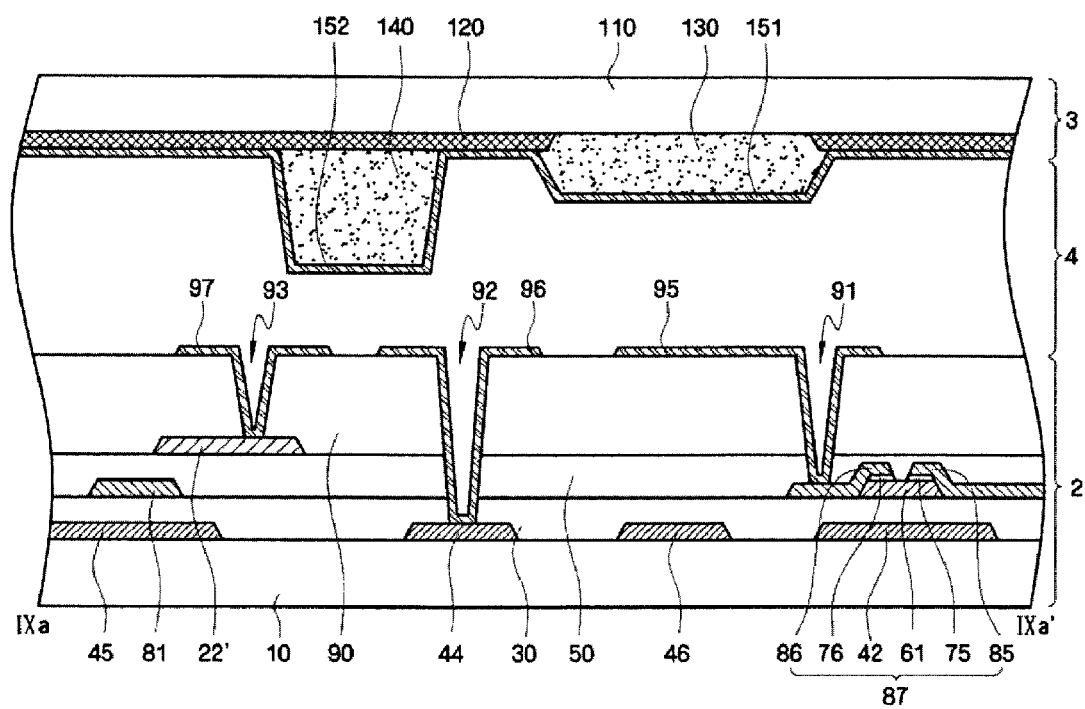
FIG. 9A is a sectional view of a display panel, taken along line IXa-IXa' in FIG. 8.
Figure 9B:
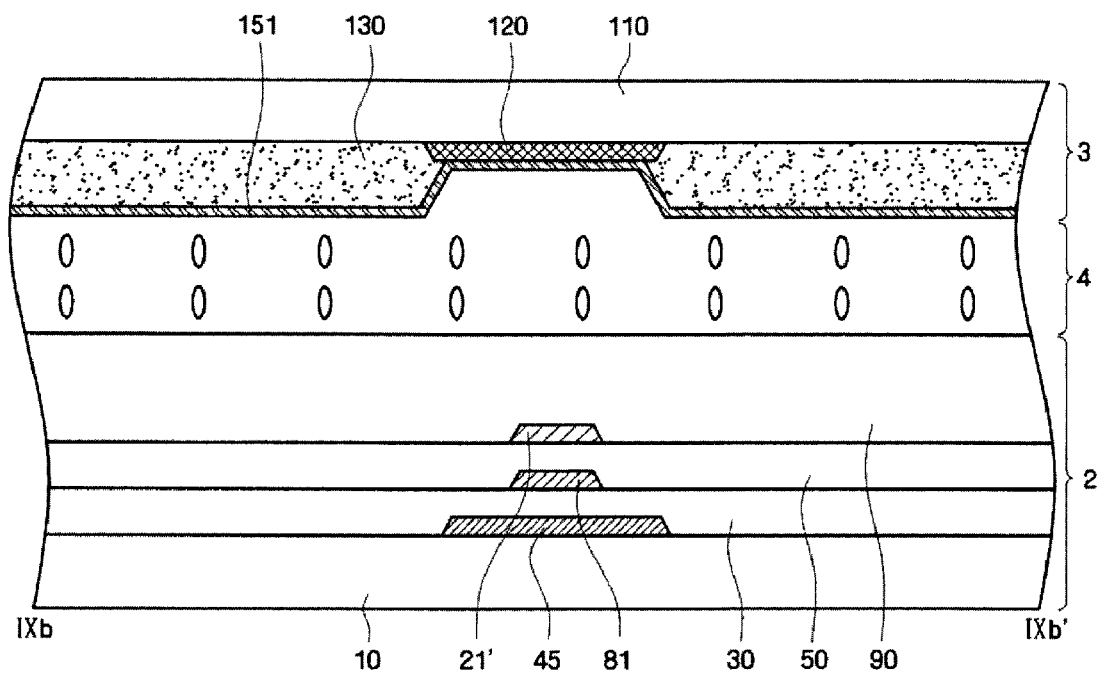
FIG. 9B is a sectional view of a display panel, taken along line IXb-IXb' in FIG. 8.

Hereinafter, with reference to FIGS. 8 to 9B, a display panel according to a second embodiment of the present invention will be described in detail. FIG. 8 is a layout diagram of a display panel according to a second embodiment of the present invention. FIG. 9A is a sectional view of a display panel, taken along line IXa-IXa' in FIG. 8, and FIG. 9B is a sectional view of a display panel, taken along line IXb-IXb' in FIG. 8. For convenience in explanation, the same drawing reference numerals are used for the same elements as the first embodiment, and the detailed description thereof will be omitted.

In a display panel 1' according to the second embodiment of the present invention, a second sensor wire 21' is formed to overlap the data line 81. In this case, the second sensor wire 21' is formed on the upper part of the data line 81, i.e. between the data line 81 and the second substrate 110.

On the first substrate 10, the gate line 41, the first sensor wire 43, and the blocking electrode 45 are formed.

The gate line 41 is formed on the first substrate 10 in the first direction, and transfers a gate signal to the thin film transistor (TFT). The first direction, for example, may be a horizontal direction of the first substrate 10. In this case, the gate line 41 may be formed as a single layer or a multi-layer made of any one of molybdenum (Mo), niobium (Nb), copper (Cu), aluminum (Al), chrome (Cr), silver (Ag), tungsten (W), titanium (Ti), and their alloys. One end part of the gate line 41 is branched to form an extended gate electrode 42.

The first sensor wire 43 is formed in the first direction in parallel to the gate line 41. The first sensor wire 43 may be formed of the same material as the gate line 41 on the same layer as the gate line 41.

As seen from the plan view depicted in FIG. 6A, the blocking electrode 45 may be formed between the gate line 41 and the first sensor wire 43 in a vertical direction of the plan view depicted in FIG. 6A. The blocking electrode 45 prevents the occurrence of interference between the second sensor wire 21' and the data line 81. The blocking electrode 45 is connected to the storage electrode 46, and a storage voltage is applied to the blocking electrode 45. The storage voltage may be a DC voltage.

On the gate line 41, the first sensor wire 43, and the blocking electrode 45, a first insulating film 30 is spread.

On the first insulating film 30, a semiconductor layer 61 made of hydrogenated amorphous silicon or polycrystalline silicon is formed. On an upper part of the semiconductor layer 61, ohmic contact layers 75 and 76 made of silicide or n+ hydrogenated amorphous silicon doped with high-density n-type impurities are formed. The ohmic contact layers 75 and 76 constitute a pair, and are positioned on the semiconductor layer 61.

On the ohmic contact layers 75 and 76 and the second insulating film 50, the data line 81 and a drain electrode 86 that corresponds to the data line 81 are formed.

The data line 81 is formed on the first substrate 10 in the second direction, and transfers data signals to each pixel. The second direction, for example, may be a vertical direction of the first substrate 10. That is, the data line 81 may be formed to cross the gate line 41. By forming the source electrode 85 and the drain electrode 86 together with the data line 81, a thin film transistor (TFT) having the gate electrode 42, the source electrode 85, and the drain electrode 86 as its three terminals, is provided.

The second insulating film 50 is formed on the first insulating film 30, the data line 81, and the thin film transistor (TFT).

The second sensor wire 21' is formed on the second insulating film 50 to overlap the data line 81. By forming the second sensor wire 21' to overlap the upper part of the data line 81, the light blocking area is reduced, and thus the aperture ratio of the display can be increased. A reference voltage for recognizing a Y-coordinate value may be applied to the second sensor wire 21'. For example, X-coordinate reference voltage and a Y-coordinate reference voltage may be applied to the first sensor wire 43 and the second sensor wire 21', respectively. In this case, if the first sensor wire 43 and the second sensor wire 21' are connected together by the sensor electrode 152 of the upper substrate 3, the X-coordinate reference voltage and the Y-coordinate reference voltage are changed. By sensing the amount of change in the X-coordinate reference voltage and the Y-coordinate reference voltage, the corresponding position on the display panel can be recognized.

A DC voltage may be applied as the X-coordinate reference voltage and the Y-coordinate reference voltage. However, in order to prevent the first sensor wire 43 and the second sensor wire 21' from being interfered with the gate line 41 or the data line 81, the same voltage as the gate signal or the data signal may be applied as the X-coordinate reference voltage and the Y-coordinate reference voltage. As described above, by making the X-coordinate reference voltage and the Y-coordinate reference voltage equal to the gate signal or the data signal, respectively, the sensitivity of the sensing signal, which would otherwise be affected by the gate line 41 or the data line 81, is preserved.

In one embodiment of the present invention, the same reference voltage as a voltage being applied to the data line is applied to the second sensor wire. Likewise, in another embodiment of the present invention, the reference voltage applied to the first sensor wire is the same as the gate voltage, or gate signal.

The passivation film 90 is formed on the upper parts of the second sensor wire 21' and the second insulating film 50. The passivation film 90 includes the first to third contact holes 91, 92, and 93 for exposing the drain electrode 86, the first sensor wire extension 44, and the second sensor wire extension 22'. Here, the first to third contact holes 91, 92, and 93 are formed by etching a part of the passivation film 90 through a mask.

On the passivation film 90, the pixel electrode 95, the first sensor pad 96, and the second sensor pad 97 are formed. The pixel electrode 95 is connected to the drain electrode 86 through the first contact hole 91, the first sensor pad 96 is connected to the first sensor wire extension 44 through the second contact hole 92, and the second sensor pad 97 is connected to the second sensor wire extension 22', through the third contact hole 93.

Hereinafter, with reference to FIGS. 8-9B, a method of manufacturing a display panel 1' according to a second embodiment of the present invention will be described in detail.

According to the plan view of the display panel 1', the gate line 41, the first sensor wire 43, and the blocking electrode 45 are formed on the first substrate 10. Specifically, the gate conduction layer is laminated on the front surface of the first substrate 10 by sputtering. Then, the gate line 41, the first sensor wire 43 and the blocking electrode 45 are formed by photo-etching the laminated gate conduction layer.

The gate line 41 and the first sensor wire 43 are formed in parallel to each other. The blocking electrode 45 is formed between the gate line 41 and the first sensor wire 43.

On the gate line 41, the first sensor wire 43, and the blocking electrode 45, the first insulating film 30 is formed by CVD (Chemical Vapor Deposition).

Then, the data conduction layer is laminated on the first insulating film 30, the semiconductor layer 61, and the ohmic contact layers 75 and 76. The data conduction layer is generally laminated on the first substrate 10 to cover the first insulating film 30, the semiconductor layer 61, and the ohmic contact layers 75 and 76. By patterning the data conduction layer by wet etching, the data line 81, the source electrode 85, and the drain electrode 86 are formed.

Then, the second insulating film 50 is formed on the first insulating film 30, the data line 81, the source electrode 85, and the drain electrode 86.

Then, the second sensor wire 21' is formed on the second insulating film 50. The second sensor wire 21' is formed by laminating the sensor wire conduction layer using a sputtering method, and patterning the laminated sensor wire conduction layer. The second sensor wire 21', as described above, is formed to overlap the data line 81. On the second sensor wire 21', the passivation film 90 is formed.

Then, by etching the passivation film 90, the first, second, and third contact holes 91, 92, and 93 are formed.

The first contact hole 91 is formed by etching the second insulating film 50 and the passivation film 90 on the drain electrode 86, the second contact hole 92 is formed by etching the first insulating film 30, the second insulating film 50, and the passivation film 90 on the first sensor wire extension 44, and the third contact hole 93 is formed by etching the passivation film 90 on the second sensor wire extension 22'.

The pixel electrode 95, the first sensor pad 96, and the second sensor pad 97 are formed on the passivation film 90.

Figure 10:
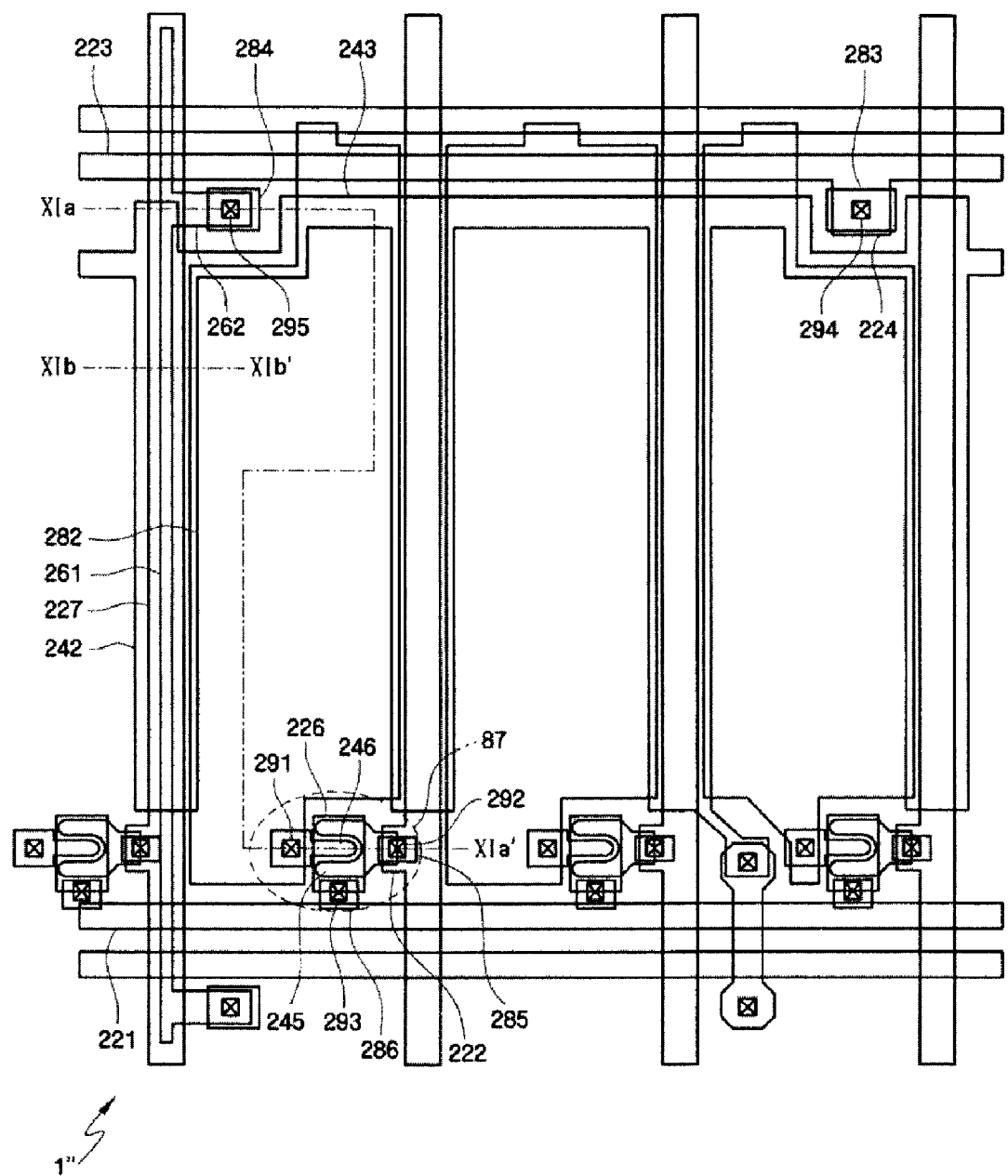
FIG. 10 is a layout diagram of a display panel according to a third embodiment of the present invention.
Figure 11A:
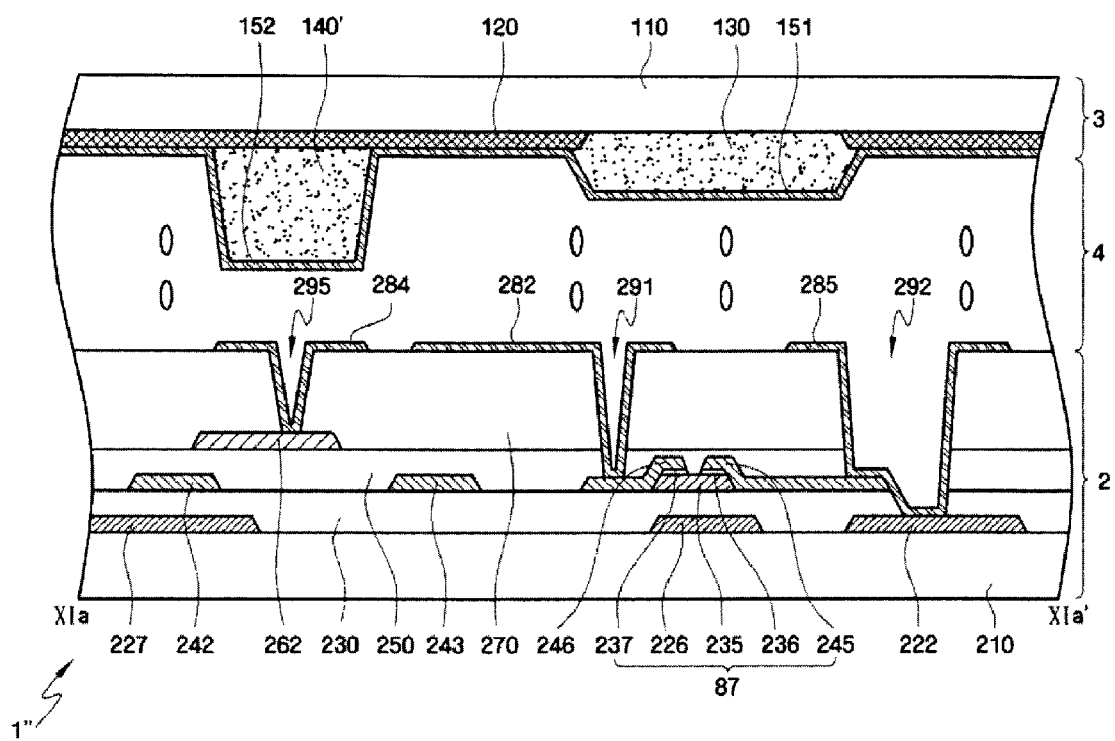
FIG. 11A is a sectional view of a display panel, taken along line XIa-XIa' in FIG. 10.
Figure 11B:
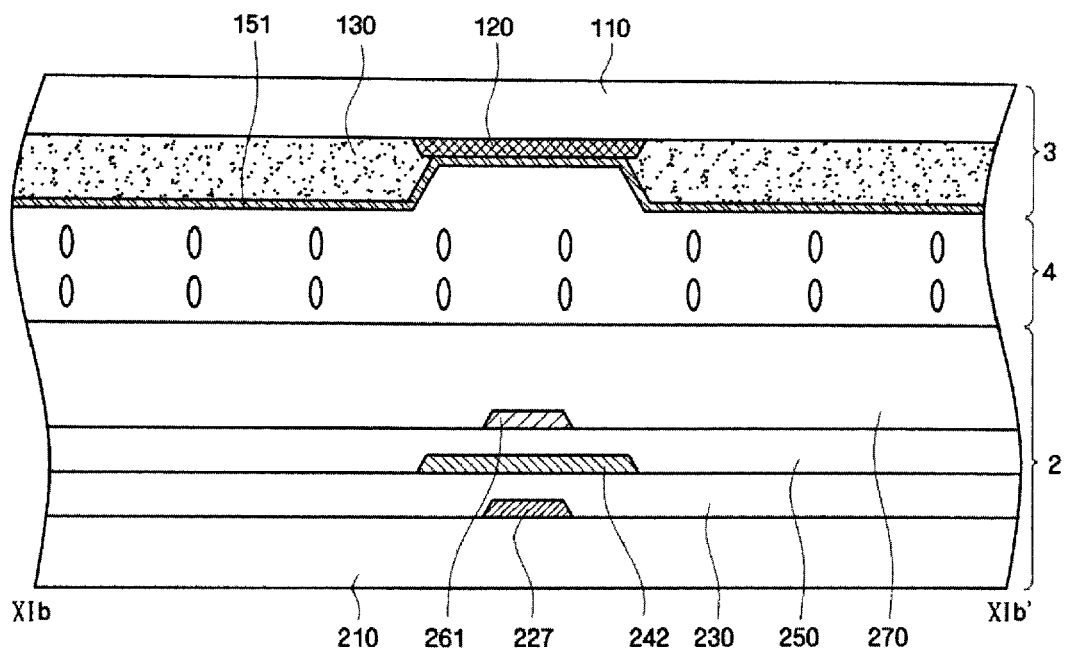
FIG. 11B is a sectional view of a display panel, taken along line XIb-XIb' in FIG. 10.

Hereinafter, with reference to FIGS. 10 to 11B, a display panel according to a third embodiment of the present invention will be described in detail. FIG. 10 is a layout diagram of a display panel according to a third embodiment of the present invention. FIG. 11A is a sectional view of a display panel, taken along line XIa-XIa' in FIG. 10, and FIG. 11B is a sectional view of a display panel, taken along line XIb-XIb' in FIG. 10. For convenience in explanation, the same drawing reference numerals are used for the same elements as the first embodiment, and the detailed description thereof will be omitted.

In a display panel 1" according to the third embodiment of the present invention, a second sensor wire 261 is formed to overlap the data line 227. In this case, the second sensor wire 261 is formed on the upper part of the data line 227, i.e. between the data line 227 and the second substrate 110.

On the first substrate 210, the data line 227 is formed. The data line 227 is formed in a vertical direction of the first substrate 210, according to the plan view shown in FIG. 10, and the gate electrode 226 is formed on the same layer as the data line 227.

The first insulating film 230 is formed on the data line 227 and the gate electrode 226. On the first insulating film 230, the gate line 221 and the first sensor wire 223, which cross the data line 227, are formed. The gate line 221 and the first sensor wire 223 are arranged in parallel to each other, according to the plan view shown in FIG. 10.

On the same layer as the gate line 221, the source electrode 245, the drain electrode 246, and the blocking electrode 242 are formed. The source electrode 245 is connected to the data line 227 through a fourth contact hole 292 whereby the first connection electrode 285 is electrically connected to the data line extension 222.

The gate electrode 226 is connected to the gate line 221 through a third contact hole 293 (shown in FIG. 10 and not shown in FIG. 11A) and a second connection electrode 286.

The blocking electrode 242 is formed on the same layer as the gate line 221, and is formed to overlap the data line 227.

On the first insulating film 230, the semiconductor layer 235, made of hydrogenated amorphous silicon or polycrystalline silicon, is formed. On the upper part of the semiconductor layer 235, ohmic contact layers 236 and 237 are formed.

The second insulating film 250 is formed on the first insulating film 230, the gate line 221, the blocking electrode 242, and the thin film transistor (TFT).

On the second insulating film 250, the second sensor wire 261 overlapping the data line 227 is formed. Since the second sensor wire 261 is formed to overlap the upper part of the data line 227, the light blocking area is reduced, and thus the aperture ratio can be increased.

The passivation film 270 is formed on the upper parts of the second sensor wire 261 and the second insulating film 250. The passivation film 270 includes the first to fifth contact holes 291, 292, 293, 294 and 295, for exposing the drain electrode 246, the data line extension 222, the gate electrode 226, the first sensor wire extension 224, and the second sensor wire extension 262, respectively.

The first sensor pad 283 is connected to the first sensor wire 223 through the fourth contact hole 294, and the second sensor pad 284 is connected to the second sensor wire 261 through the fifth contact hole 295. The first sensor pad 283 and the second sensor pad 284 may be formed in a pixel area, and as illustrated in FIG. 10, the first sensor pad 283 and the second sensor pad 284 may be formed in different pixel areas. The first sensor pad 283 and the second sensor pad 284 may be formed in different adjacent pixel areas within the limits in which no substantial difference in position accuracy occurs. In one embodiment, the sensor spacer may be divided into a first sensor spacer and a second sensor spacer, which are formed to overlap the first sensor pad 283 and the second sensor pad 284, respectively, and establish electrical contact between the two, upon touch by a user. Therefore, the first sensor spacer and the second sensor spacer may be formed on different pixels.

Although preferred embodiments of the present invention have been described for illustrative purposes, those skilled in the art will appreciate, in light of the foregoing, that various modifications, additions and substitutions are possible, without departing from the scope and spirit of the invention as disclosed herein.

What is claimed is:

1. A display panel comprising:
    a first substrate;
    a gate line and a data line crossing each other on the first substrate, the gate line and the data line being electrically insulated from each other;
    a first sensor wire formed in parallel to the gate line;
    a second sensor wire formed to overlap the data line in parallel to the data line;
    a second substrate faced to the first substrate; and
    a sensor spacer formed on the second substrate to project toward the first substrate; and
    a blocking electrode that is disposed on the first substrate so as to be sandwiched between the data line and the second sensor wire and so as to thereby shield the second sensor wire from data signals of the data line.

2. The display panel of claim 1 wherein the first sensor wire is formed of the same material as the gate line and on the same layer as the gate line.

3. The display panel of claim 1, wherein the second sensor wire is formed between the data line and the first substrate.

4. The display panel of claim 1, wherein
    the second sensor wire is formed between the data line and the second substrate.

5. The display panel of claim 1, wherein the blocking electrode is formed between the data line and the second sensor wire.

6. The display panel of claim 1, wherein the blocking electrode is connected such that a DC voltage is applied to the blocking electrode.

7. The display panel of claim 1, wherein the blocking electrode is formed between the data line and the first substrate.

8. The display panel of claim 1, wherein the blocking electrode is formed of a same material as that of the gate line and in a same layer as that of the gate line.

9. The display panel of claim 1, wherein a first reference voltage is applied to the first sensor wire, and a second reference voltage is applied to the second sensor wire.

10. The display panel of claim 9, wherein the same reference voltage as a voltage being applied to the data line is applied to the second sensor wire.

11. The display panel of claim 1, wherein at least a part of the data line is formed between the first substrate and the gate line.

12. The display panel of claim 11, further comprising a thin film transistor having a gate electrode connected to the gate line, a source electrode connected to the data line, and a drain electrode spaced apart from the source electrode;
   wherein the source electrode is connected to the data line through a first connection electrode and the gate electrode is connected to the gate line through a second connection electrode.

13. A method of manufacturing a display panel, comprising:
   forming first and second sensor wires on a first substrate;
   forming a first insulating layer on the second sensor wire;
   forming a gate line, which crosses the second sensor wire, on the first insulating layer;
   forming a second insulating layer on the gate line and on the first sensor wire;
   forming a data line also on a first substrate such that the data line is in parallel and overlapping relation with the second sensor wire; and
   forming a blocking electrode between the data line and the second sensor wire, the blocking electrode overlapping the data line.

14. The method of claim 13, wherein the second sensor wire is formed between the data line and the first substrate.

15. A method of manufacturing a display panel, comprising:
   forming a gate line and a first sensor wire that is in parallel to the gate line on a first substrate;
   forming a first insulating layer on the gate line and the first sensor wire;
   forming a data line, which crosses the gate line and the first sensor wire, on the first insulating layer;
   forming a second insulating layer on the data line; and
   forming a second sensor wire formed to overlap the data line in parallel to the data line; and
   forming a blocking electrode between the first substrate and the data line, the blocking electrode overlapping the data line.

16. A method of manufacturing a display panel, comprising:
   forming a data line on a first substrate;
   forming a first insulating layer on the data line;
   forming a gate line and a first sensor wire, which insulatingly cross the data line, on the first insulating layer;
   forming a second insulating layer on the gate line and the first sensor wire; and
   forming a second sensor wire formed to overlap the data line in parallel to the data line; and
   forming a blocking electrode between the data line and the second sensor wire, the blocking electrode overlapping the data line.

* * * * *